Patented Oct. 16, 1951

2,571,526

UNITED STATES PATENT OFFICE 2,571,526

CERAMIC COMPOSITION

Louis Bonnet, Cuxac-Carbardes, France, assignor to General Motors Corporation, Detroit, Mich., a corporation of Delaware No Drawing. Application July 31, 1947, Serial No. 765,249. In France February 1, 1940

Section 1, Public Law 690, August 8, 1946
Patent expires February 1, 1960

7 Claims. (Cl. 106—62)

The present invention has for its object a ceramic composition by which can be obtained products which are remarkable for their physical and mechanical properties rendering them particularly advantageous in their use as spark plug insulators, insulators for high frequency and other electric currents, thermal insulators for heating apparatus, abrasives, and the like.

This composition is characterized by a mixture of practically pure calcined alumina, with a flux comprising an alkaline earth tribasic phosphate, and with a refractory plasticiser comprising a hydrated silicate of aluminium.

By practically pure alumina is here understood calcined alumina containing from 98% up to 100% of aluminium oxide, $Al_2O_3$. This material can be introduced into the present composition in very high proportions such that the final products contain for example up to 86% or 87% of alumina.

The flux is preferably composed of the tribasic phosphate of magnesium, $(PO_4)_2Mg_3$ which allows one to obtain pure-white products: however, one can in certain cases replace this phosphate, either completely or partially by the tribasic phosphate of calcium, $(PO_4)_2Ca_3$.

The plasticiser adapted to give the mixture the proper plasticity for moulding or forming the products, is composed of a hydrated silicate of aluminium such as a refractory aluminous clay or kaolin, generally added to a hydrated silicate of magnesium, $(MgO)_3(SiO_2)_4H_2O$, or to a very plastic aluminous silicate called bentonite. The term "refractory aluminous clay" is not intended to include the very plastic aluminum silicate such as bentonite.

The mixture thus obtained can be cast, moulded, pressed, turned, or otherwise formed. By virtue of its composition it is sufficient to fire it at a relatively slightly high temperature, say between 1440° C. and 1540° C. to obtain products having the following properties:

A density exceeding 3 and sometimes 3.3
A hardness of at least 8.5 on the Mohs scale
A zero porosity
A high tensile strength
A high resistance to heat shock
A high dielectric value both hot and cold
A low loss angle at high frequencies
A high thermal conducitivity.

The following are three exemplary formulae according to the invention.

Formula I

Calcined alumina, 80 parts by weight;
Tribasic phosphate of magnesium, 3 parts by weight;
Tribasic phosphate of calcium, 3 parts by weight;
Hydrated magnesium silicate, 3.5 parts by weight;
Refractory aluminous clay (of 19% water), 24 parts by weight.

This mixture, ground with water, can be moulded, pressed or turned. It is fired at about 1440°–1460° C.

Formula II

Calcined alumina, 80 parts by weight;
Tribasic phosphate of magnesium, 6 parts by weight;
Magnesium carbonate, 0.2 part by weight;
Kaolin (of 22% water), 11 parts by weight;
Bentonite (of 13% water), 3 parts by weight.

This mixture, ground with water, can be pressed or turned, and is fired at a temperature of about 1520° C.–1540° C.

Formula III

Calcined alumina, 80 parts by weight;
Tribasic phosphate of magnesium, 3 parts by weight;
Calcium carbonate, 7 parts by weight;
Hydrated silicate of magnesium, 4 parts by weight;
Kaolin (of 13% water), 3 parts by weight.

This mixture, finely ground, added to a 5% solution of aluminium chloride, $Al_2Cl_6$, can be cast or otherwise shaped and subsequently fired at about 1500° C.–1520° C.

The foregoing formulae, when converted to percentages, fall within approximately the following ranges:

| | Per cent |
|---|---|
| Aluminum oxide | 70 to 82 |
| Plasticizer | 7 to 24 |
| Tribasic calcium phosphate, tribasic magnesium phosphate or mixtures of the two | 3 to 6 |

The fired products as determined by theoretical chemical analysis on the basis of the oxide content fall within approximately the following ranges:

| | Per cent |
|---|---|
| $Al_2O_3$ | 81.7 to 87.5 |
| MgO | 2.2 to 2.9 |
| CaO | 0 to 4.2 |
| $P_2O_5$ | 2.7 to 4.2 |
| $SiO_2$ | 1.7 to 11.7 |

The total alkaline earth oxide content varies from approximately 2.9% to 7.0%.

These formulae are given as non-limiting examples, and one can without departing from the invention change the proportions of the various substances to some extent, replace some by equivalent materials, or add small quantities of inert materials.

The term "plasticizer" as used herein means a hydrated silicate of aluminum such as a refractory aluminus clay or kaolin, with or without a hydrated silicate of magnesium or bentonite.

I claim:

1. A ceramic composition consisting of a mixture of about 70–82% practically pure calcined alumina, about 3–6% of tribasic phosphate selected from the group consisting of tribasic calcium phosphate, tribasic magnesium phosphate and mixtures thereof, and about 7–24% of plasticizer, said plasticizer containing as the essential ingredient thereof a refractory aluminous clay.

2. A ceramic composition consisting of a mixture of about 70–82% practically pure calcined alumina, about 3–6% of tribasic phosphate selected from the group consisting of tribasic calcium phosphate, tribasic magnesium phosphate and mixtures thereof, and about 7–24% of plasticizer, said plasticizer consisting of a refractory aluminous clay and bentonite.

3. A ceramic composition consisting of a mixture of about 70–82% practically pure calcined alumina, about 3–6% of tribasic phosphate selected from the group consisting of tribasic calcium phosphate, tribasic magnesium phosphate and mixtures thereof, and about 7–24% of plasticizer, said plasticizer consisting of a refractory aluminous clay and hydrated magnesium silicate.

4. A ceramic composition consisting of a mixture of about 70–82% practically pure calcined alumina, about 3–6% of tribasic calcium phosphate and about 7–24% of a plasticizer, said plasticizer containing as the essential ingredient thereof a refractory aluminous clay.

5. A ceramic composition consisting of a mixture of about 70–82% practically pure calcined alumina, about 3–6% of tribasic calcium phosphosphate and about 7–24% of a plasticizer, said plasticizer consisting of a refractory aluminous clay and bentonite.

6. An insulator for spark plugs or the like made by forming to the desired shape and firing to a dense, non-porous body an intimately ground and mixed ceramic composition as defined in claim 1.

7. A ceramic composition consisting of:

Calcined alumina, 80 parts by weight;
Tribasic phosphate of magnesium, 3 parts by weight;
Tribasic phosphate of calcium, 3 parts by weight;
Hydrated magnesium silicate, 3.5 parts by weight;
Refractory aluminous clay (of 19% water), 24 parts by weight.

LOUIS BONNET.

REFERENCES CITED

The following references are of record in the file of this patent:

UNITED STATES PATENTS

| Number | Name | Date |
|---|---|---|
| 2,207,558 | Singer | July 9, 1940 |
| 2,419,290 | Schaefer | Apr. 22, 1947 |

FOREIGN PATENTS

| Number | Country | Date |
|---|---|---|
| 396,532 | Great Britain | 1933 |
| 480,982 | Great Britain | 1938 |
| 865,686 | France | 1941 |